(12) United States Patent  (10) Patent No.: US 8,293,052 B2
Aoshima et al.  (45) Date of Patent: Oct. 23, 2012

(54) POLYMER FILM STRETCHING METHOD

(75) Inventors: Shinsuke Aoshima, Minami-ashigara (JP); Misao Takahashi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 629 days.

(21) Appl. No.: 12/408,428

(22) Filed: Mar. 20, 2009

(65) Prior Publication Data

US 2009/0242105 A1  Oct. 1, 2009

(30) Foreign Application Priority Data

Mar. 26, 2008  (JP) .................................. 2008-079871

(51) Int. Cl.
  *B65H 69/06*  (2006.01)
(52) U.S. Cl. ......................... 156/159; 156/157; 156/229
(58) Field of Classification Search .................. 156/157, 156/159
  See application file for complete search history.

(56) References Cited

U.S. PATENT DOCUMENTS

| | | | | |
|---|---|---|---|---|
| 1,727,349 A | * | 9/1929 | Lyman | 352/233 |
| 3,243,337 A | * | 3/1966 | Haselow et al. | 428/57 |
| 4,106,974 A | * | 8/1978 | Hirsch | 156/504 |
| 2003/0181881 A1 | * | 9/2003 | Makolin et al. | 604/358 |
| 2007/0068618 A1 | * | 3/2007 | Buchanan | 156/157 |

FOREIGN PATENT DOCUMENTS

| JP | 2002-311240 A | 10/2002 |
|---|---|---|
| JP | 2005-104148 A | 4/2005 |

OTHER PUBLICATIONS

JP 2002-311240 machine translation.*

* cited by examiner

*Primary Examiner* — Mark A Osele
(74) *Attorney, Agent, or Firm* — Sughrue Mion, PLLC

(57) ABSTRACT

A front end portion of a following film is superimposed on a rear end portion of a preceding film to form a superimposed portion, and is joined thereto by a double-sided adhesive tape. The length of the double-sided adhesive tape in a film conveyance direction is shorter than that of the superimposed portion. The double-sided adhesive tape adheres to the rear end portion with leaving a rear space from a rear edge, and to the front end portion with leaving a front space from a front edge. The length of the rear space in the film conveyance direction is a maximum shrinkage of a first area, being a part of the front end portion superimposed on the rear space, or more. Likewise, the length of the front space in the film conveyance direction is a maximum shrinkage of a second area or more.

4 Claims, 6 Drawing Sheets

POLYMER FILM STRETCHING METHOD

FIELD OF THE INVENTION

The present invention relates to a polymer film stretching method.

BACKGROUND OF THE INVENTION

To manufacture a polymer film used in optical applications, a casting die casts dope onto a casting support to make a cast film. The cast film is peeled from the casting support and is dried to be a film. Then, the film is wound around a winding shaft into a roll. This is a manufacturing method of the film called solution casting method. Cellulose acylate is used as polymer, and triacetyl cellulose (TAC) is one of the cellulose acylate.

Japanese Patent Laid-Open Publication No. 2002-311240 discloses to stretch a TAC film manufactured by solution casting facilities by an off-line stretching line separately built from a solution casting line for the purpose of improving smoothness, mechanical strength, optical properties and the like (hereinafter called off-line stretch).

For the sake of efficient off-line stretch, as disclosed in Japanese Patent Laid-Open Publication No. 2002-311240, it is preferable to continuously stretch a film. Thus, when a plurality of film rolls are subjected to the off-line stretch, a front end of a film fed from a film roll is superimposed on a rear end of another film fed from a preceding film roll, and a superimposed portion is joined together by a double-sided adhesive tape.

Stretching the TAC film in a width direction, however, causes a necking phenomenon, in which the middle of the TAC film in the width direction shrinks largely in a film conveyance direction though both widthwise ends of the TAC film clipped by a tenter hardly shrink. In the superimposed portion, the necking phenomenon occurs in both of the TAC film and the double-sided adhesive tape. The TAC film shrinks more largely than the adhesive tape, so that the adhesive tape often appears from the superimposed portion after stretch. The appearance of the adhesive tape allows an adhesive to adhere to a conveyor roll and the like, resulting in a conveyance problem of frequent occurrence. It is conceivable, on the other hand, that the length of the superimposed portion in the film conveyance direction is made enough larger than that of the adhesive tape to prevent the appearance of the adhesive tape. In this case, however, an unjoined portion of the superimposed portion tends to be caught on the conveyor roll and the like, and brings about another conveyance problem.

SUMMARY OF THE INVENTION

An object of the present invention is to provide a method for efficiently subjecting a TAC film to off-line stretch with preventing the appearance of an adhesive tape.

To achieve the foregoing object, a polymer film stretching method according to the present invention comprises the steps of stretching a polymer film strip in a film width direction with catching both widthwise ends of the polymer film strip, and joining a preceding film and a following film into the polymer film strip by superimposing a front end portion of the following film on a rear end portion of the preceding film with a double-sided adhesive tape before the stretching step. The length of the double-sided adhesive tape in a film conveyance direction is shorter than the length of the rear end portion and the front end portion in the conveyance direction. The double-sided adhesive tape adheres to the rear end portion with leaving a rear space from a rear edge. The double-sided adhesive tape adheres to the front end portion with leaving a front space from a front edge. The length of the rear space in the conveyance direction is larger than a shrinkage of a first area, being a part of the front end portion superimposed on the rear space, in the film conveyance direction in stretching the polymer film strip in the film width direction. The length of the front space in the film conveyance direction is larger than a shrinkage of a second area, being a part of the rear end portion on which the front space is superimposed, in the film conveyance direction in stretching the polymer film strip in the film width direction.

The method may further comprise the step of determining the shrinkage of the first area and the second area in the film conveyance direction, before the joining step.

Each of the rear and front spaces may be trimmed into a convex shape.

It is preferable that the length of each of the rear and front spaces in the film conveyance direction is between or equal to 3 mm and 15 mm.

The polymer film may be made of cellulose acylate. The double-sided adhesive tape may have a base ribbon containing polyester and adhesive layers provided on both surfaces of the base ribbon.

According a polymer film stretching method of the present invention, the length of the double-sided adhesive tape in the film conveyance direction is shorter than that of the rear end portion and the front end portion. The double-sided adhesive tape adheres to the rear end portion with leaving a rear space from a rear edge, and adheres to the front end portion with leaving a front space from a front edge. The length of the rear and front spaces in the conveyance direction is larger than a shrinkage of the first area and the second area in the conveyance direction in stretching the polymer film strip in the width direction. Accordingly, the double-sided adhesive tape does not appear in the superimposed portion after completing a stretching process. Therefore, the present invention enables to continuously and efficiently subject the TAC film on off-line stretch with preventing the occurrence of a conveyance problem and the like.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

Figure 1:
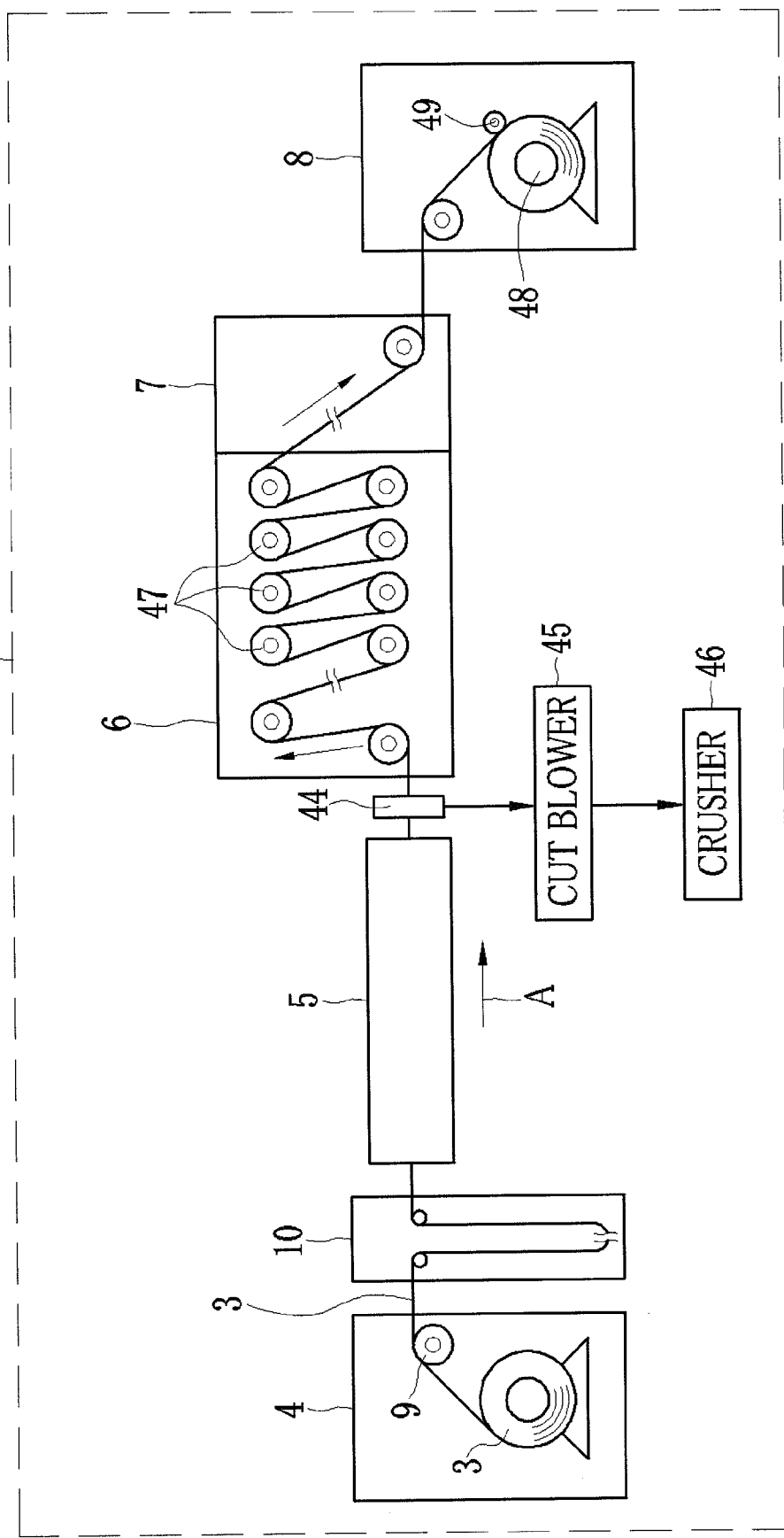
FIG. 1 is a schematic view of an off-line stretching apparatus.

Referring to FIG. 1, an off-line stretching apparatus 2 for stretching a TAC film 3 consists of a film feeding chamber 4, a tenter 5, a heat relaxation chamber 6, a cooling chamber 7 and a winding chamber 8. The film feeding chamber 4 contains a roll of the TAC film 3 manufactured in a solution casting apparatus, and feeds the TAC film 3 to the tenter 5 by a feed roller 9.

Figure 2:
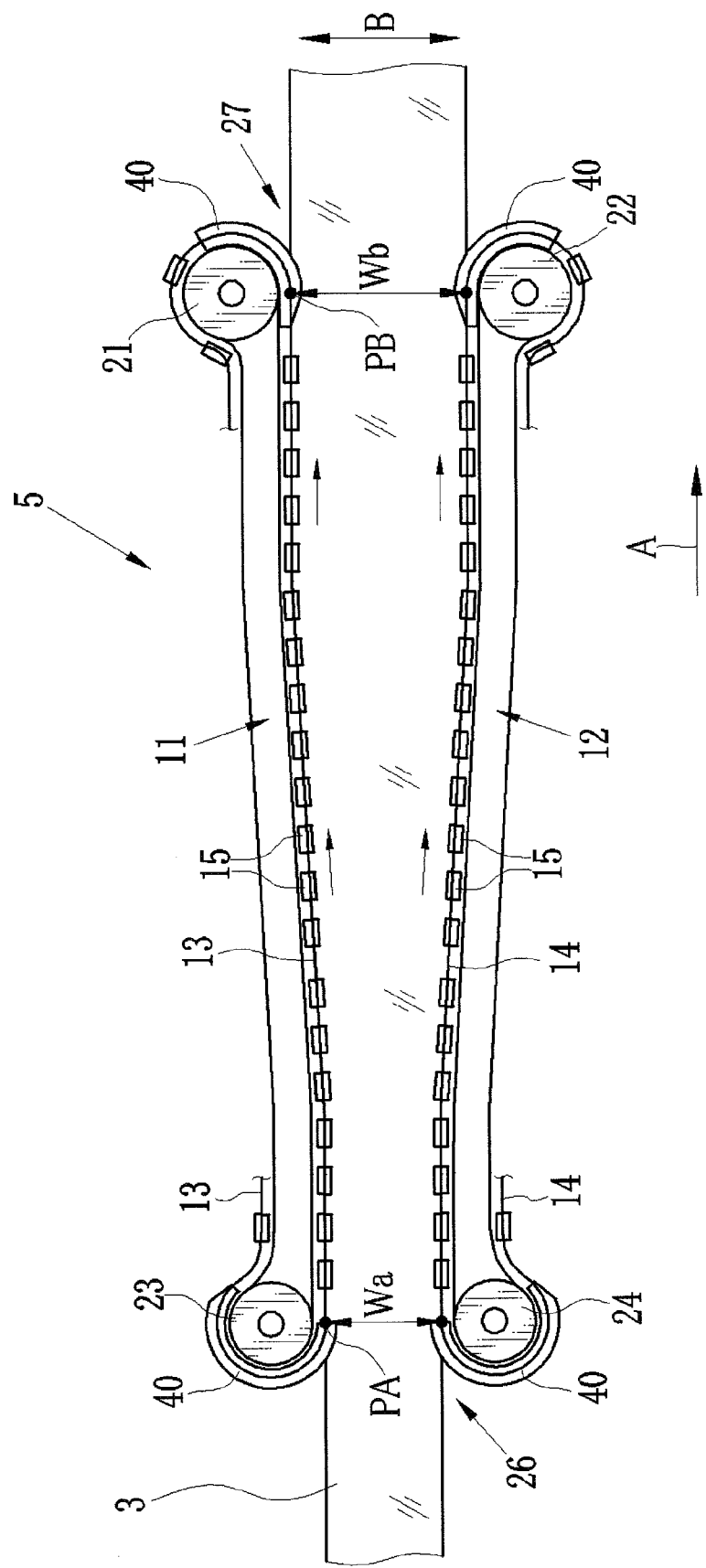
FIG. 2 is a top plan view of a tenter.

As shown in FIG. 2, when a B direction refers to a film width direction, clips 15 catch both B-directional ends of the TAC film 3 fed into the tenter 5. The TAC film 3 is heated and stretched in the B direction with conveyance.

As shown in FIG. 1, a reserver 10 is provided between the film feeding chamber 4 and the tenter 5. The reserver 10 has rollers to stock the TAC film 3. The TAC film 3 loops in the reserver 10 and fed into the tenter 5 without letup even if a joining process described later requires some time.

The tenter 5, as shown in FIG. 2, subjects the TAC film 3 to a stretching process by which the TAC film 3 is stretched in the B direction with being conveyed in a film conveyance direction A (hereinafter called A direction). The tenter 5 is provided with a first rail 11, a second rail 12 and first and second chains (endless chains) 13 and 14 guided by the rails 11 and 12. The tenter 5 is kept hot inside. The tenter 5 may have a few zones in the A direction, and each zone has a different film heating condition as required. The tenter 5 may have, for example, a preheating zone, a heating zone and a heat relaxing zone in this order in the A direction.

To the first and second chains 13 and 14, many clips 15 are attached at regular intervals. The clips 15 move along each rail 11, 12 with holding B-directional ends of the TAC film 3, so that the TAC film 3 is stretched in the B direction. The rails 11 and 12 are disposed in such a manner that the B-directional width Wb of the TAC film 3 at a film releasing position PB is larger than the B-directional width Wa of the TAC film 3 at a film catching position PA. A stretch ratio 100×Wb/Wa in the tenter 5 is preferably 100.5 to 300%.

The first chain 13 is looped over a drive sprocket wheel 21 and a driven sprocket wheel 23, and the second chain 14 is looped over a drive sprocket wheel 22 and a driven sprocket wheel 24. The first rail 11 guides the first chain 13 between the sprocket wheels 21 and 23, and the second rail 12 guides the second chain 14 between the sprocket wheels 22 and 24. The drive sprocket wheels 21 and 22 are provided at a tenter outlet 27, and the driven sprocket wheels 23 and 24 are provided at a tenter inlet 26.

Figure 3:
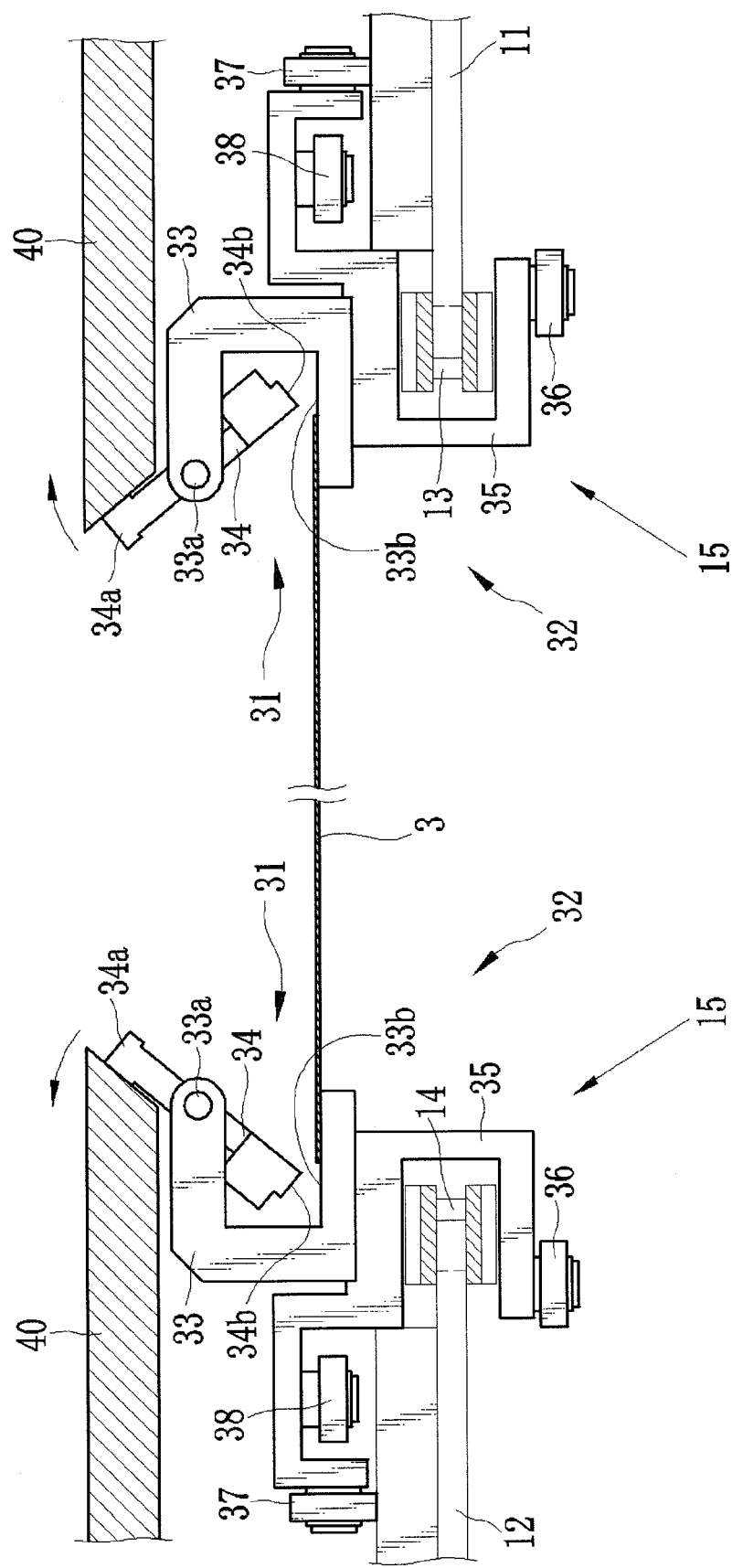
FIG. 3 is a side view of clips.

Referring to FIG. 3, the clip 15 consists of a clip body 31 and a rail attaching portion 32. The clip body 31 has an approximately U-shaped frame 33 and a flapper 34. The flapper 34 is rotatably attached to the frame 33 via a shaft 33a. The flapper 34 is movable between a closed position for perpendicularly catching the TAC film 3 and an open position shown in FIG. 3. In the open position, an engagable head 34a makes contact with a clip opener 40, and the flapper 34 is inclined to release the TAC film 3. The flapper 34 is usually biased to the closed position by self weight.

The rail attaching portion 32 has an attachment frame 35 and guide rollers 36 to 38. To the attachment frame 35, the first chain 13 or second chain 14 is attached. The guide rollers 36 to 38 make contact with a support face of the drive sprocket wheel 21 or 22, a support face of the first or second rail 11 or 12 and the like and rotate. Accordingly, the clips 15 are guided along each rail 11, 12 without dropping off the drive sprocket wheel 21, 22 and the rail 11, 12.

A clip opener 40 is provided around each of the sprocket wheels 21 to 24. In the driven sprocket wheels 23 and 24 at the tenter inlet 26, the clip opener 40 makes contact with the engagable head 34a of the clip 15 just before the film catching position PA. This contact sets the flapper 34 into the open position, so that the clip 15 can receive the B-directional end of the TAC film 3. No sooner does the clip 15 pass the film catching position PA, than the engagable head 34a gets away from the clip opener 40 so that the flapper 34 is set into the close position from the open position. Accordingly, the clip 15 catches the B-directional end of the TAC film 3 between a film holding face 33b and a flapper bottom face 34b. In the drive sprocket wheels 21 and 22 disposed at the tenter outlet 27, in a like manner, the engagable head 34a of the clip 15 comes into contact with the clip opener 40 at the film releasing position PB. This contact sets the flapper 34 into the open position. Thus, the clips 15 release the both B-directional ends of the TAC film 3.

Figure 4:
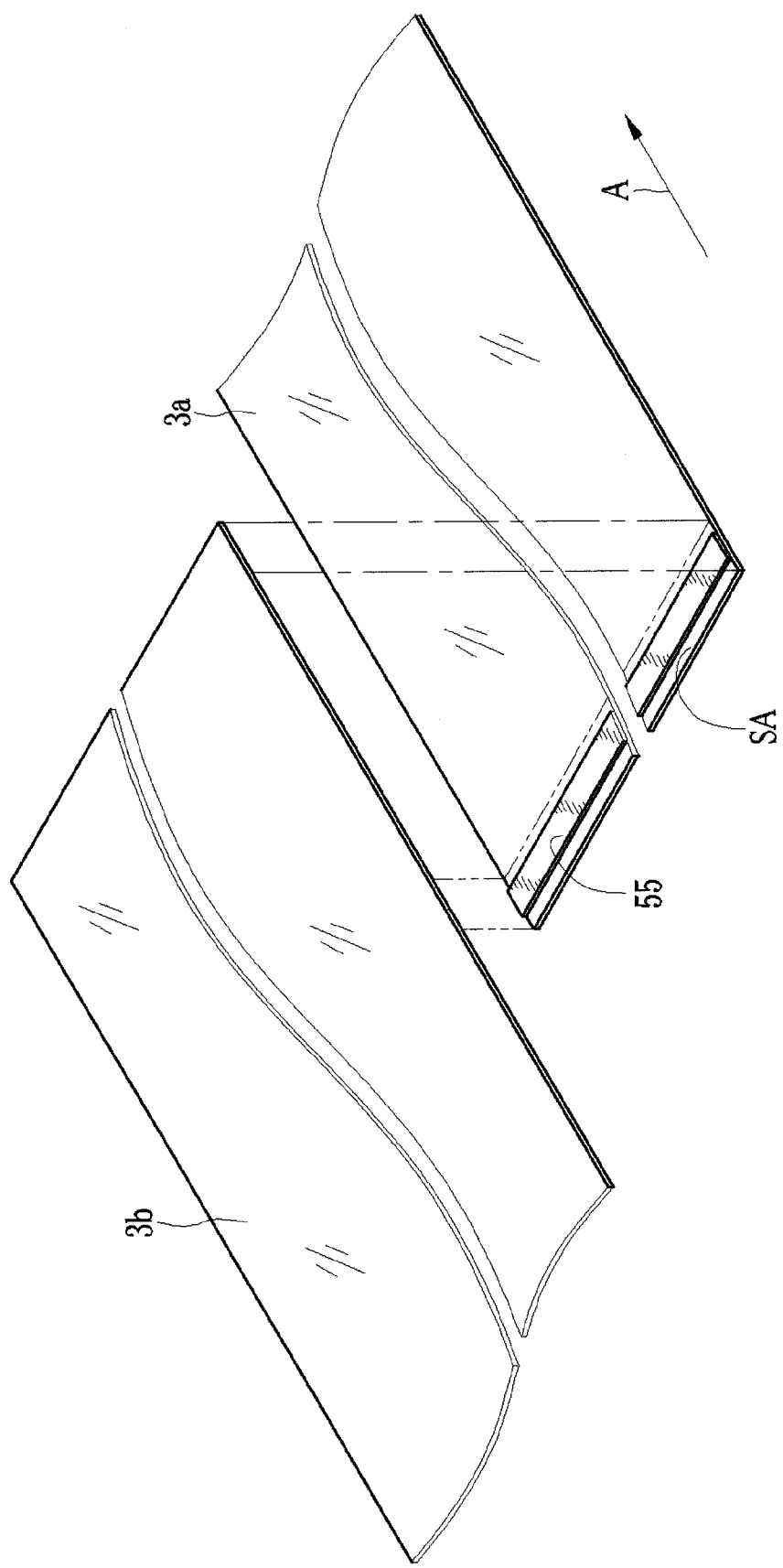
FIG. 4 is an explanatory view of a joining process.

The film feeding chamber 4, as shown in FIG. 4, carries out a film joining process which joins a TAC film (preceding film) 3a fed from a preceding film roll to another TAC film (following film) 3b fed from a new roll in order to continuously stretch the TAC film 3 in the tenter 5. In the joining process, a front end portion of the following film 3b is superimposed on a rear end portion of the preceding film 3a, and is joined with a double-sided adhesive tape 55 No. 532 made by Nitto Denko Corporation. The double-sided adhesive tape 55 has a base ribbon and adhesive layers provided on both surfaces of the base ribbon.

It is preferable that the double-sided adhesive tape 55 keeps the two films 3a and 3b joined together even after completing the stretching process. The base ribbon is made of a material that is stretchable after the films 3a and 3b without ripping. The base ribbon may be made of polyester or a material containing polyester. Otherwise, another double-sided adhesive tape without the base ribbon is available. The adhesive layer can keep adhesion between the two films 3a and 3b in the stretching process, and may contain, for example, an acrylic or silicone adhesive.

Referring to FIG. 1, the TAC film 3 is subjected to the stretching process in the tenter 5, and is then sent to the edge slitter 44. The edge slitter 44 slits the both B-directional ends of the TAC film 3. Then, a cut blower 45 cuts slit end strips being cuttings into small pieces. A not-illustrated air blower blows the cut pieces into a crusher 46, and the crusher 46 crushes the pieces into chips. Since the chips are recycled as a material for preparing dope, this method has a cost advantage.

The TAC film 3 is then sent to the heat relaxation chamber 6. The heat relaxation chamber 6 is provided with a lot of rollers 47. The TAC film 3 is conveyed over the rollers 47 with relaxation by heating, and is sent to the cooling chamber 7. In the heat relaxation chamber 6, an air blower (not illustrated) blows warm air at desired temperature. The temperature of the air is preferably 20 to 250° C.

The TAC film 3 after heat relaxation is cooled to 30° C. or less, and is then sent to the winding chamber 8. The winding chamber 8 has a winding roller 48 and a press roller 49. The winding roller 48 winds up the TAC film 3, while the press roller 49 applies pressure thereto.

Figure 5A:
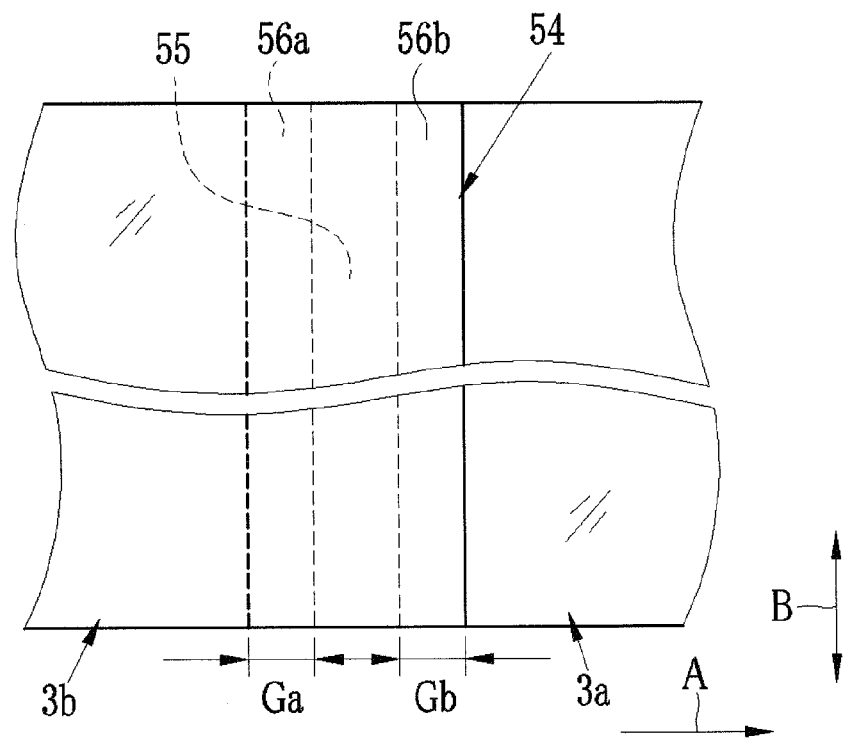
FIG. 5A is a top plan view of a superimposed portion before a stretching process according to a first embodiment.

Next, the joining process for joining the rear end portion of the preceding film 3a and the front end portion of the following film 3b will be described in detail. In the joining process, as shown in FIG. 4, a superimposed area SA is allocated in the rear end portion of the preceding film 3a. Then, the double-sided adhesive tape 55 is glued to the superimposed area SA so as to approximately align the middle of the double-sided adhesive tape 55 in the A direction with that of the superimposed area SA. Then, the front end portion of the following film 3b is overlaid on the superimposed area SA. By the joining process, as shown in FIG. 5A, the front end portion of the following film 3b is superimposed on and adheres to the rear end portion of the preceding film 3a to form the superimposed portion 54.

The A-directional length of the double-sided adhesive tape 55 is shorter than that of the superimposed portion 54. In addition, the middle of the double-sided adhesive tape 55 in the A direction approximately aligns with that of the superimposed portion 54. Accordingly, a rear space 56a to which the double-sided adhesive tape 55 does not adhere is left at a rear end of the film 3a in the superimposed portion 54. Likewise, a front space 56b is left at a front end of the film 3b. The A-directional length of the rear space 56a is Ga, and the A-directional length of the front space 56b is Gb. The middle of the double-sided adhesive tape 55 in the A direction does not necessarily align that of the superimposed portion 54, as long as the rear space 56a is left at the rear end of the film 3a and the front space 56b is left at the front end of the film 3b.

Figure 5B:
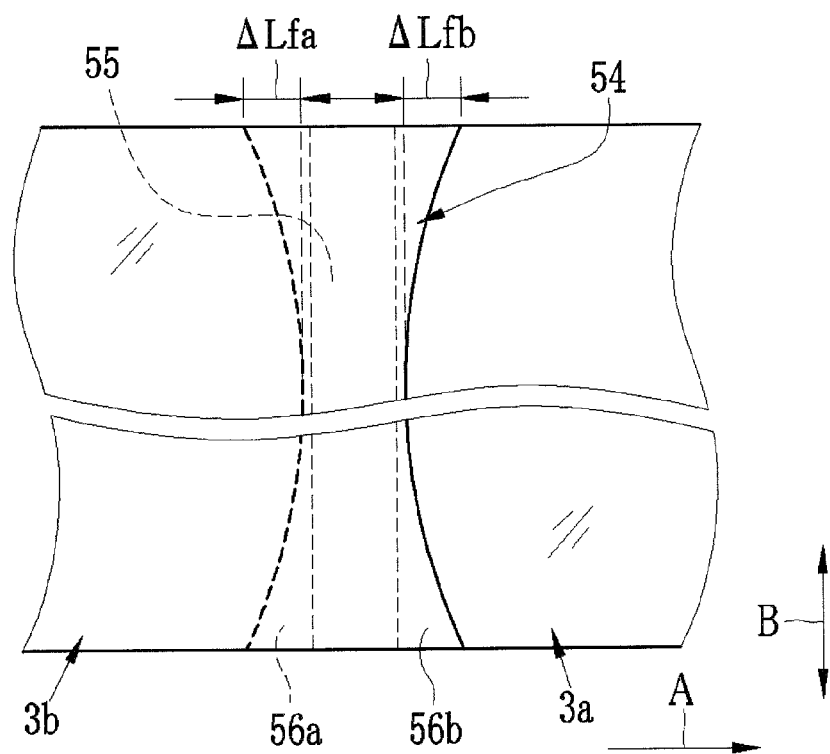
FIG. 5B is a top plan view of the superimposed portion after the stretching process according to the first embodiment.

As shown in FIG. 3, the TAC film 3, into which the films 3a and 3b are joined, is fed into the tenter 5. In the tenter 5, the clips 15 catch the both B-directional ends of the TAC film 3 and stretch it in the B direction. As shown in FIG. 5B, stretching the films 3a and 3b in the B direction shrinks them in the A direction. At this time, since the clips 15 catch the both B-directional ends, the films 3a and 3b hardly shrink at the B-directional ends. Shrinkage increases with getting near to the middle from the ends in the B direction, and reaches its maximum $\Delta Lfa$, $\Delta Lfb$ at the middle. The double-sided adhesive tape 55, on the other hand, hardly shrinks in the A direction as compared with the TAC film 3.

In the present invention, the A-directional length Ga of the rear space 56a is $\Delta Lfa$ or more. The A-directional length Gb of the front space 56b is $\Delta Lfb$ or more. Thus, the double-sided adhesive tape 55 does not appear from the stretched TAC film 3. According to the present invention, it is possible to efficiently stretch the TAC film 3 with preventing a conveyance problem and the like.

The A-directional lengths Ga and Gb of the rear and front spaces 56a and 56b are not limited in particular, as long as the double-sided adhesive tape 55 does not appear from the superimposed portion 54 after completing the stretching process and the unglued rear and front edges of the TAC films 3a and 3b do not get caught to a peripheral device, member and the like in conveying the TAC film 3. The lengths Ga and Gb are preferably between or equal to 3 mm and 15 mm, and more preferably between or equal to 5 mm and 10 mm.

Figure 6A:
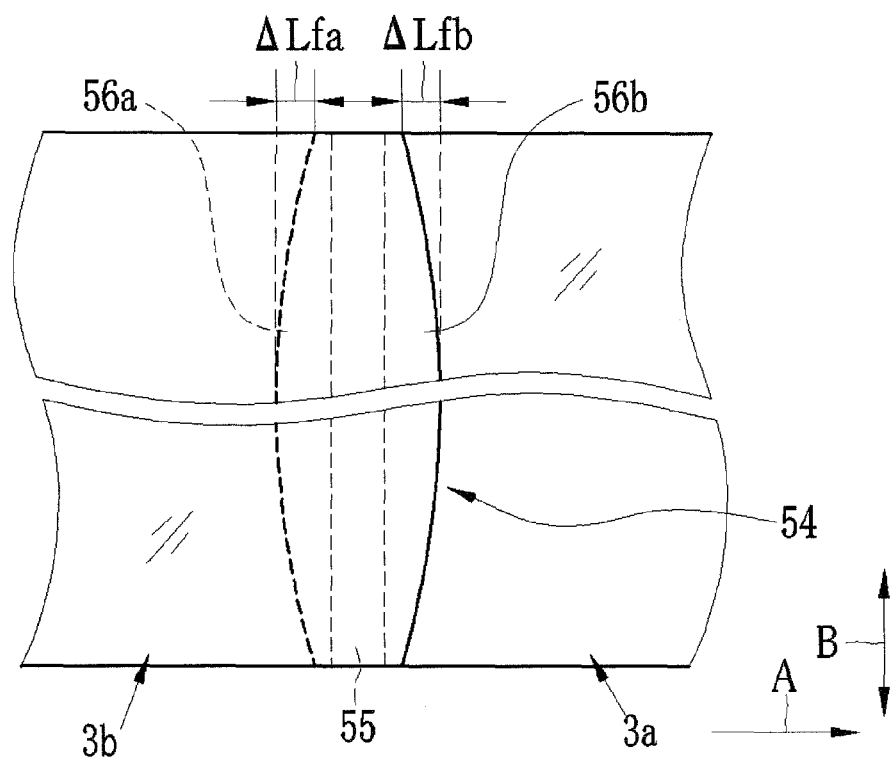
FIG. 6A is a top plan view of a superimposed portion before the stretching process according to a second embodiment.
Figure 6B:
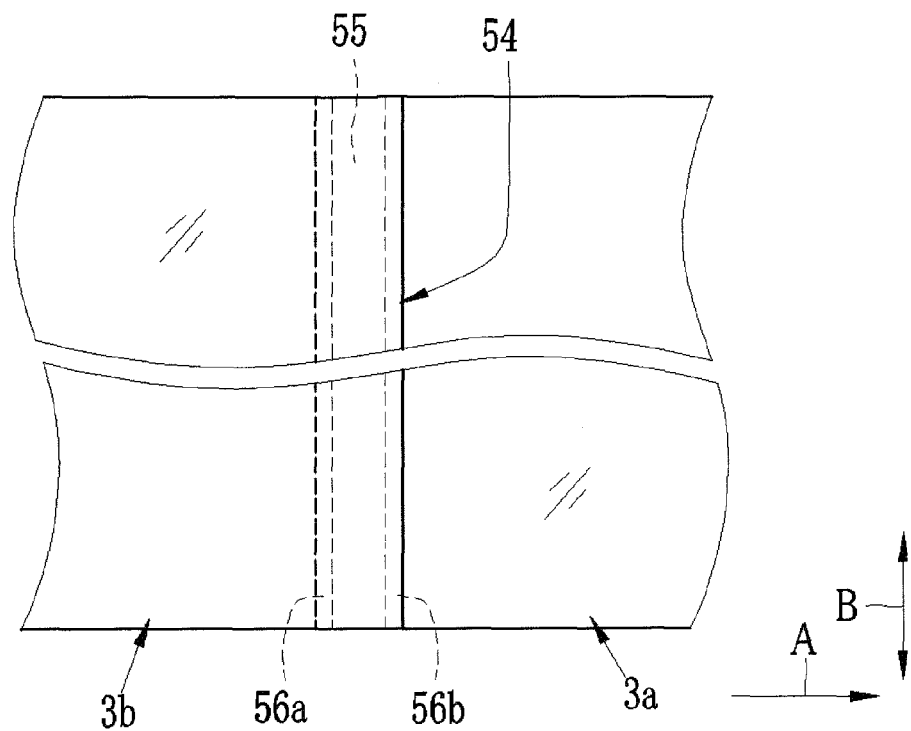
FIG. 6B is a top plan view of the superimposed portion after the stretching process according to the second embodiment.

As shown in FIG. 6A, a rear edge of the film 3a and a front edge of the film 3b may be processed convexly, into an arc shape in which the middle in the B direction protrudes. The A-directional length of the space 56a, 56b increases with getting near to the middle from the B-directional ends so as to compensate the shrinkage of the film 3a, 3b. The stretching process, as shown in FIG. 6B, deforms the rear edge of the film 3a and the front edge of the film 3b into straight. This minimizes the space 56a, 56b after completing the stretching process, and hence it is possible to certainly prevent the conveyance problem.

Any TAC film 3 is available as long as it has been manufactured by a commonly known solution casting method. For example, a TAC film disclosed in Japanese Patent Laid-Open Publication No. 2005-104148 is available. Applying the present invention to a TAC film, which is manufactured by casting dope containing TAC and a solvent onto a peripheral surface of a cooled casting drum, peeling a cast film after being hardened to have a self-supporting property, drying via a pin tenter, winding and storing, efficiently and sophisticatedly provides the superior optical properties to the TAC film.

In the present invention, the TAC film 3 is used as a polymer film. The polymer film, however, is not limited to the TAC film 3 and the present invention is applicable to various types of polymer films.

What is claimed is:

1. A method for stretching a polymer film strip conveyed on a line in a film width direction, said method comprising the steps of:
    stretching said polymer film strip in said film width direction with catching both widthwise ends of said polymer film strip;
    joining a preceding film and a following film into said polymer film strip by superimposing a front end portion of said following film on a rear end portion of said preceding film with a double-sided adhesive tape before said stretching step, the length of said double-sided adhesive tape in a film conveyance direction being shorter than the length of said rear end portion and said front end portion in said conveyance direction, said double-sided adhesive tape adhering to said rear end portion with leaving a rear space from a rear edge, said double-sided adhesive tape adhering to said front end portion with leaving a front space from a front edge, the length of said rear space in said conveyance direction being larger than a shrinkage of a first area, being a part of said front end portion superimposed on said rear space, in said film conveyance direction in stretching said polymer film strip in said film width direction, and the length of said front space in said film conveyance direction being larger than a shrinkage of a second area, being a part of said rear end portion on which said front space is superimposed, in said film conveyance direction in stretching said polymer film strip in said film width direction; and further comprising the step of:
    determining said shrinkage of said first area and said second area in said film conveyance direction, before said joining step.

2. The method recited in claim 1, wherein each of said rear space and said front space is trimmed into a convex shape.

3. The method recited in claim 1, wherein the length of each of said rear space and said front space in said film conveyance direction is between or equal to 3 mm and 15 mm.

4. The method recited in claim 1, wherein said polymer film is made of cellulose acylate, and said double-sided adhesive tape has a base ribbon containing polyester and adhesive layers provided on both surfaces of said base ribbon.

* * * * *